United States Patent [19]

Horton

[11] Patent Number: 5,282,663
[45] Date of Patent: Feb. 1, 1994

[54] RETRACTING SYSTEM FOR FLEXIBLE SIDE WALLS FOR CARGO VEHICLES

[75] Inventor: Terry F. Horton, Whittier, Calif.

[73] Assignee: Utility Trailer Manufacturing Company, City of Industry, Calif.

[21] Appl. No.: 820,300

[22] Filed: Jan. 10, 1992

[51] Int. Cl.⁵ .............................................. B60J 5/06
[52] U.S. Cl. ..................... 296/155; 296/181; 296/138; 49/360; 160/118; 160/201; 160/150
[58] Field of Search .............. 296/155, 181, 183, 138, 296/99.1; 49/360; 160/150, 159, 188, 201, 118; 414/516

[56] References Cited

U.S. PATENT DOCUMENTS

| | | | |
|---|---|---|---|
| 2,269,579 | 1/1942 | Chilton | 160/150 X |
| 2,318,886 | 5/1943 | Paiement | 414/516 |
| 2,843,422 | 7/1958 | Black | 49/360 X |
| 4,095,371 | 6/1978 | Knippel | 49/360 X |
| 4,545,611 | 10/1985 | Broadbent | 296/155 X |
| 4,700,985 | 10/1987 | Whitehead | 296/181 |
| 4,738,052 | 4/1988 | Yoshida | 49/360 X |
| 4,762,361 | 8/1988 | Horton et al. | 296/183 X |
| 4,795,208 | 1/1989 | Whiteman | 296/181 |
| 4,826,236 | 5/1989 | Bennett | 296/181 |
| 4,943,110 | 7/1990 | Pastva | 296/181 |
| 4,952,009 | 8/1990 | Mountz et al. | 296/183 X |
| 5,082,043 | 1/1992 | Moreno | 160/188 X |

FOREIGN PATENT DOCUMENTS

| | | | |
|---|---|---|---|
| 0311242 | 4/1989 | European Pat. Off. | 296/138 |
| 0444733 | 9/1991 | European Pat. Off. | 296/183 |
| 2106573 | 4/1983 | United Kingdom | 296/138 |

Primary Examiner—Michael S. Huppert
Assistant Examiner—Stephen Gordon
Attorney, Agent, or Firm—Lyon & Lyon

[57] ABSTRACT

A retracting system for flexible side walls utilized for cargo vehicles wherein the flexible side wall is attached at one end to a slidable door used to extend and retract the flexible side wall. This system provides a narrow slidable door connected to a system of pulleys and cables that maintain the slidable door perpendicular to the floor and roof of the vehicle during horizontal movement of the slidable door for closing or opening the open side of a cargo carrying vehicle. The system can incorporate a reversible motor to propel the system and move the slidable door without a pushing or pulling force rom a human operator. The slidable door is suspended from a track at the top edge of the door keeping the slidable door in alignment and decreasing rolling resistance.

13 Claims, 1 Drawing Sheet

RETRACTING SYSTEM FOR FLEXIBLE SIDE WALLS FOR CARGO VEHICLES

The present invention relates to retracting systems for flexible side walls utilized with cargo carrying vehicles, such as trucks and trailers. Vehicles with flexible side walls have been utilized in the cargo vehicle field to allow access to the full length of the cargo area through an open side. The flexible side walls consist of numerous individual panels separately supported by poles spaced horizontally in pockets along the length of the flexible side wall which support each individual panel. These poles are in turn supported by rollers located at the top of each pole.

To open and close a flexible side wall, the pulling or pushing force is normally applied by a human operator standing at ground level by pulling or pushing the slidable door near its lower edge. However, this may be approximately seven to nine feet below the rolling support and resistance of the track at the roof level which supports the slidable door. Therefore, this pushing or pulling creates a rotational force couple on the rollers at the top of the slidable door which often is sufficient to cause binding and non-rolling movement of these rollers before the full side opening is achieved. The poles supporting the flexible side wall can also twist out of alignment further hampering efforts to open or close the flexible side wall.

The conventional rolling support assemblies on the flexible wall and the door rollers accumulate a considerable amount of drag. This drag is progressive as the sliding resistance of each additional support pole is added as the door is opened progressively wider during opening. The drag may also be progressive while the door is progressively closed during closing. The conventional flexible side wall systems such as those described in U.S. Pat. No. 4,545,611 and in U.S. Pat. No. 4,762,361 suggest the necessity for a comparatively wide door. In these conventional systems, the door is supported by a system of rollers with as much separation or wheelbase as possible in the direction of opening the flexible side wall, which manifests itself in the necessity for a wider door to accommodate this wheelbase. However, this is contrasted with the needs during loading and unloading situations where it is desirable to develop the widest possible side opening by providing the narrowest door possible. This leads to the unwanted reduction in the wheelbase of the rollers, so that the door becomes difficult to pull or push open. Some operators cannot open the flexible side wall due to the large accumulated drag forces from the wall coupled with the large size and heavy weight of the slidable doors.

The present invention allows the use of both standard sized and narrow doors or door panels which remain perpendicular to the floor and roof of the cargo vehicle during opening and closing and which can remain perpendicular regardless of the accumulated drag force or the pushing effort. A feature of the invention utilizes a system of pulleys and cables which maintain the door perpendicular to the roof and floor during all opening and closing movements without regard for where the pulling or pushing force is applied. In this feature, a first cable is first connected to the door and then is directed around pulleys on the door and onto a pulley on the cargo area which then redirects the cable back to the door to reattach to the door near the top. A second cable secured to the door opposite the first cable and is likewise routed around a second series of pulleys and then also reattached to the door at or near the top of the door. The result of this is that a push by the operator at the bottom of the door causes a resultant pull at the top of the door in the same direction, thus driving the door in the direction of the opening or closing push on the door as desired. The door thus remains substantially perpendicular to the floor because of the resultant horizontal forces exerted by the operator and cables which counteracts the force couple which tends to cause the door to bind up.

Another feature allows for the automated operation of the opening and closing of the door and flexible side wall by coupling a reversible drive motor or other drive means to at least one of the pulleys on the cargo vehicle. A plastic ribbon chain or other flexible connectors may be used instead of the cables. In one feature, the door may be supported by rollers at the top of the slidable door. An extension secured to the door projects upward vertically and attaches to a guide, which extends horizontally beyond the width of the door in the direction of movement. The guide is supported by rollers positioned on a track which may span the length of the side opening and supports the door. Alternatively, the top of the door may be aligned by the extension only at its top of the slidable door which then acts as a blade aligning the door in a track. The weight of the door is then supported by rollers placed at the bottom of the door at the floor of the cargo vehicle.

Accordingly, it is an object of the present invention to provide a retracting system for flexible side walls for cargo vehicles but other and more detailed objects and advantages will appear to those skilled in the art from the following description and the accompanying drawings, wherein.

Figure 1:
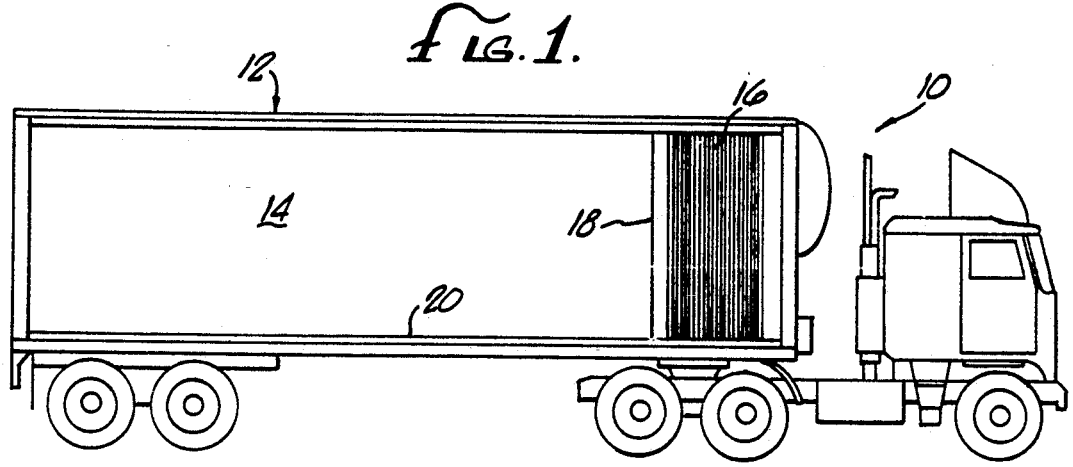
FIG. 1 is an elevation view of a cargo vehicle with flexible side walls and the cargo area open.

Referring now to the figures, a cargo vehicle 10 is shown in FIG. 1 having a roofed cargo area 12 with a side opening 14. The flexible side wall 16 is shown in the compacted position with the slidable door 18 connected to it, exposing the side opening 14. The flexible side wall 16 may be extended along the length of the side opening 14. The slidable door 18 is narrower in construction than in prior art systems thus allowing better access to the cargo area 12 along a greater length of the side opening 14.

Figure 2:
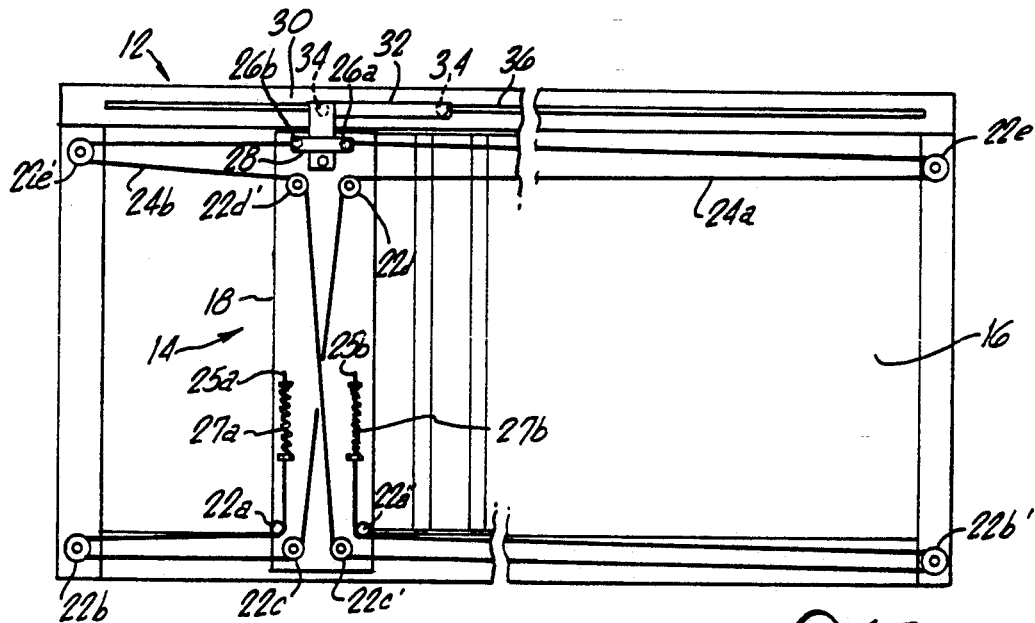
FIG. 2 is a side elevation view of the present invention illustrating the slidable door and the system of pulleys and cables from inside the cargo area.

FIG. 2 illustrates the plurality of pulleys 22a through 22e and 22a' through 22e' with the cables 24a and 24b. This figure illustrates their relative positions along the side opening 14 with respect to the flexible side wall 16 and the slidable door 18. The cable 24a is first secured to the slidable door 18 at a first end 25a by an adjustable or spring loaded means 27a for maintaining tension on the cable. The cable 24a is then routed around an initial pulley 22a secured on a lower position on the slidable door 18 and onto pulley 22b which is positioned on the frame of the cargo area 12. The cable 24a is then rerouted around pulley 22b to a third pulley 22c also at a lower point on the slidable door 18. The cable is then redirected around pulley 22c up and across the door 18 to pulley 22d at a higher position on the door 18. This pulley 22d redirects the cable 24a over to pulley 22e and then back to the second end 26a on the door 18. Pulleys 22a to 22e may be called the first series of pulleys. A second cable 24b is also attached to the door 18 opposite the first cable 24a at its first end 25b by an adjustable or spring-loaded means 27b and also is directed around five pulleys 22a' to 22e' (second series of pulleys) to attach to the door 18 at the second end 26b of cable 24b.

Figure 4:
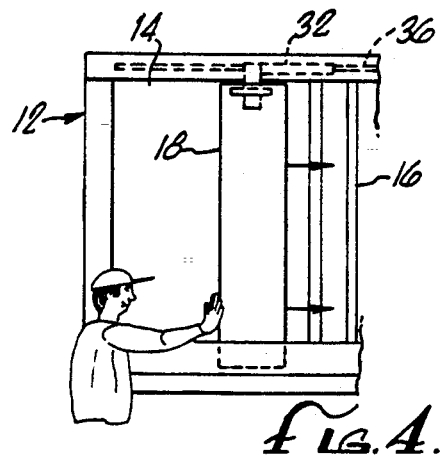
FIG. 4 illustrates the typical operator method of opening the conventional systems and illustrates the applied force (by arrows) achieved by a combination of the operator push and the pulleys and cables of the present invention.

As illustrated in FIG. 4, this system allows a push at the bottom of the door by the operator to result in a pull at the top of the slidable door 18 by a cable 24a or 24b. This push and resultant pull also is achieved when the slidable door 18 is pushed in the opposite direction by the operator. The resultant forces on the door 18 by the cables 24a and 24b in both opening and closing cause it to remain substantially perpendicular to the floor 20 of the cargo area 12. It should be noted that for clarity of illustration in the Figures the pulleys are shown as rather large while they need not be that large and the locations of the pulleys and cables are separated from adjacent pulleys and cables whereas they may be positioned very close to each other and to the roof and floor.

Figure 3:
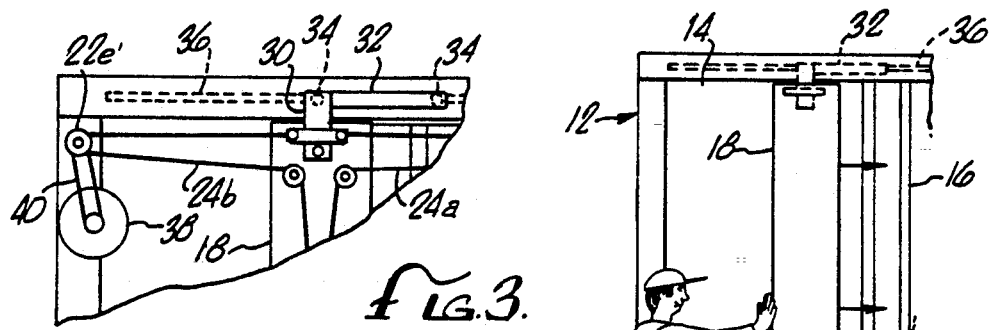
FIG. 3 is a side cut-away view which schematically shows the drive means or reversible motor of the present invention coupled to one of the pulleys on the cargo vehicle.

Another feature is shown in FIG. 3, whereby a motor 38 or drive means (shown in a schematic fashion) is coupled to a pulley 22e' by a drive belt 40. The motor 38 or drive means may instead be directly coupled to a pulley 22e'. As shown, the motor 38 or other drive means may be reversible, to allow movement of the slidable door 18 and the flexible side wall 16 in a horizontal direction to both open and close the side opening 14 and to allow closing or exposing of the cargo area 12. More than one motor 38 may be utilized with the present invention. Plastic ribbon chains or other flexible connecting means may be substituted for the cables 24a and 24b.

The slidable door 18 is suspended from a track 36 positioned in the upper area of the cargo area 12 as illustrated in FIGS. 2 and 3. A bracket 28 is secured to the door 18 at the second cable end attachments 26a and 26b. An extension 30 extends vertically upward from the door 18 and secures the bracket 28 and the door 18 to a horizontally extending guide 32. The guide 32 extends beyond the edge of the door 18 in the direction of opening and closing the side opening 14 and is slidably secured by at least two rollers 34 onto an upper track 36 to permit rolling movement of the guide 32 along the length of the side opening 14. This track 36 also keeps the slidable door 18 in alignment while the slidable door 18 is being moved. FIG. 4 shows the operation of the door 18 and the guide 32 while the flexible side wall 16 is being pushed open by the operator and illustrates the resultant forces by arrows on the door 18.

While the preferred embodiment of the present invention and modifications thereto have been shown and disclosed in the drawings and specification, alternate embodiments of the present invention may be apparent to a person of ordinary skill in the art and this application is intended to include those embodiments within the scope of the claims herein. Moreover, the present invention need not include all of the features disclosed in a single embodiment but rather one or more features may be included.

What is claimed is:

1. A flexible side cargo vehicle having a cargo area with a floor and with at least one open side providing access to said cargo area, said open side being closable by at least one slidable door and a flexible side wall attached to the slidable door, the improvement comprising: a plurality of pulleys affixed to both said cargo vehicle and said slidable door, a first flexible connecting means having one end secured to said door and initially directed around one of said pulleys on said door and then routed around one or more of said pulleys on said cargo vehicle and said door so that the other end of said first flexible connecting means is also secured to said door and a second flexible connecting means having one end secured to said door and then initially routed around a second one of said pulleys on said door and then directed around one or more of said pulleys on said cargo vehicle and said door so that the other end of said second flexible connecting means is secured to said door adjacent to said other end of said first flexible connecting means to cause controlled movement of said slidable door along the open side so that said slidable door remains perpendicular to the floor during opening and closing of the open side by the slidable door and the flexible side wall.

2. The improvement of claim 1 wherein a motor is coupled to at least one of said pulleys, said motor capable of actuating said flexible connecting means and pulleys to cause said controlled movement of the slidable door in a direction of opening and closing the open side.

3. The improvement of claim 1 or claim 2 wherein said flexible connecting means comprise at least one cable.

4. The improvement of claim 1 or claim 2 wherein said flexible connecting means comprise at least one plastic ribbon chain.

5. The improvement of claim 1 wherein said slidable door is attached to a guide, slidably secured by rollers onto a track positioned along the top of said open side.

6. A flexible side cargo vehicle having a cargo area with a floor and with at least one open side providing access to said cargo area, said open side being closable by at least one slidable door and a flexible side wall attached to the slidable door, the improvement comprising: a plurality of pulleys affixed to both said cargo vehicle and said slidable door, at least one flexible connecting means routed around said pulleys and attached to said slidable door to cause controlled movement of said slidable door along the open side with said slidable door remaining perpendicular to the floor during opening and closing of the open side by the slidable door and the flexible side wall, wherein said slidable door is slidably secured by a guide which extends beyond a width of the door in a direction of movement of said door, with said guide positioned on a track separate from a support for said flexible side wall.

7. The improvement of claim 1 wherein two separate plurality of pulleys are provided, and a separate flexible connecting means is provided for each plurality of pulleys.

8. A cargo carrying vehicle having an open side with a flexible side wall supported on the vehicle for closing and opening the open side and a slidable door connected to the flexible side wall, the improvement comprising a series of pulleys mounted on the vehicle and the slidable door, cables routed around said pulleys and connected to the slidable door for causing the opening and closing of the open side by moving the slidable door along the open side wherein said slidable door is slidably secured by a guide which extends beyond a width of the door in a direction of movement of the door, with said guide positioned on a track separate from a support for said flexible side wall.

9. The improvement of claim 1 or claim 8 wherein said slidable door is supported by rollers at the floor of said cargo area.

10. The improvement of claim 8 wherein two series of pulleys are provided, and a cable is routed around each series of pulleys.

11. The improvement of claim 10 further comprised of more than one slidable door.

12. A flexible side cargo vehicle comprising an open side providing access to a cargo area, with the open side being closable by an automated closing means with a slidable door and a flexible side wall capable of opening and closing said open side, comprising:
 (a) a first series of pulleys and a second series of pulleys attached to said slidable door and said cargo vehicle;
 (b) a first flexible connecting means with one end secured to said slidable door and sequentially engaging said first series of pulleys and thereafter attached to the door at the other end of said first flexible connecting means;
 (c) a second flexible connecting means, having one end secured to the slidable door and sequentially engaging said second series of pulleys and thereafter attached to the door at the other end of said second flexible connecting means; and
 (d) a drive means for causing the automated operation of said pulleys and said first and second connecting means to propel said slidable door in a horizontal direction along the open side to open and close said open side.

13. A flexible side cargo vehicle comprising an open side providing access to a cargo area, with the open side being closable by an automated closing means with a slidable door and a flexible side wall capable of opening and closing said open side, comprising:
 (a) a first series of pulleys and a second series of pulleys attached to said slidable door and said cargo vehicle;
 (b) a first flexible connecting means with one end secured to said slidable door and sequentially engaging said first series of pulleys and thereafter attached to the door at the other end of said first flexible connecting means;
 (c) a second flexible connecting means, having one end secured to the slidable door and sequentially engaging said second series of pulleys and thereafter attached to the door at the other end of said flexible connecting means;
 (d) a drive means for causing the automated operation of said pulleys and said first and second connecting means to propel said slidable door in a horizontal direction along the open side to open and close said open side;
 (e) wherein said slidable door is slidably secured by a guide which extends beyond a width of said door in a direction of the movement of the door, said guide secured onto a track separate from a support for said flexible side wall.

* * * * *